United States Patent
Fogwill

(10) Patent No.: US 10,955,394 B2
(45) Date of Patent: Mar. 23, 2021

(54) SYSTEM AND METHOD FOR DIAGNOSING A CONDITION OF A RESTRICTOR

(71) Applicant: Waters Technologies Corporation, Milford, MA (US)

(72) Inventor: Michael O. Fogwill, South Grafton, MA (US)

(73) Assignee: Waters Technologies Corporation

( * ) Notice: Subject to any disclaimer, the term of this patent is extended or adjusted under 35 U.S.C. 154(b) by 203 days.

(21) Appl. No.: 16/157,702

(22) Filed: Oct. 11, 2018

(65) Prior Publication Data
US 2019/0113488 A1    Apr. 18, 2019

Related U.S. Application Data

(60) Provisional application No. 62/571,440, filed on Oct. 12, 2017.

(51) Int. Cl.
*G01N 30/86* (2006.01)
*B01D 15/40* (2006.01)
*G01N 30/32* (2006.01)
*B01D 15/16* (2006.01)

(52) U.S. Cl.
CPC ....... *G01N 30/8665* (2013.01); *B01D 15/163* (2013.01); *B01D 15/40* (2013.01); *G01N 30/32* (2013.01); *G01N 30/8658* (2013.01)

(58) Field of Classification Search
CPC ............... G01N 30/32; G01N 30/8658; G01N 30/8665; B01D 15/40; B01D 15/163
See application file for complete search history.

(56) References Cited

U.S. PATENT DOCUMENTS

| 3,696,666 A * | 10/1972 | Johnson | F02M 35/09 |
| | | | 73/114.31 |
| 4,814,089 A * | 3/1989 | Kumar | G01N 30/28 |
| | | | 210/659 |
| 4,845,985 A * | 7/1989 | Berger | G01N 30/28 |
| | | | 73/23.25 |
| 4,962,662 A * | 10/1990 | Berger | G01N 30/28 |
| | | | 73/23.42 |
| 5,163,979 A * | 11/1992 | Patrick | G01N 30/32 |
| | | | 73/23.36 |
| 5,205,156 A * | 4/1993 | Asano | B01D 46/0086 |
| | | | 73/38 |
| 5,346,622 A * | 9/1994 | Klee | B01D 15/08 |
| | | | 210/198.2 |
| 5,545,252 A * | 8/1996 | Hinshaw | G01N 30/32 |
| | | | 73/23.25 |
| 6,183,635 B1 * | 2/2001 | Klee | B01D 15/08 |
| | | | 210/198.2 |
| 6,338,823 B1 | 1/2002 | Furukawa | |
| 7,111,494 B2 | 9/2006 | Tipler | |

(Continued)

FOREIGN PATENT DOCUMENTS

EP    0329290 A2    8/1989
KR    2005-0030204 A *    3/2005

*Primary Examiner* — John Fitzgerald
(74) *Attorney, Agent, or Firm* — Womble Bond Dickinson (US) LLP; Deborah M. Vernon; Heath T. Misley

(57) ABSTRACT

The present disclosure relates to methodologies, systems, apparatus, and kits for diagnosing the condition of a restrictor element in a chromatography system based on flow rate measurements, or pressure measurements, or both.

20 Claims, 11 Drawing Sheets

(56) References Cited

U.S. PATENT DOCUMENTS

| | | | |
|---|---|---|---|
| 7,559,227 B2* | 7/2009 | Thompson | G01N 30/18 73/23.35 |
| 10,006,890 B2* | 6/2018 | Fogwill | G01N 30/30 |
| 10,371,673 B2* | 8/2019 | Fogwill | G01N 30/62 |
| 2006/0157408 A1* | 7/2006 | Kuroda | B01D 65/10 210/636 |
| 2006/0186028 A1* | 8/2006 | Hughes | G01N 30/10 210/198.2 |
| 2007/0277592 A1* | 12/2007 | Johansson | B01D 46/0086 73/38 |
| 2008/0215259 A1* | 9/2008 | Hairston | F04B 51/00 702/47 |
| 2009/0166525 A1* | 7/2009 | Hughes | B01D 15/163 250/282 |
| 2011/0113866 A1* | 5/2011 | Finlay | G01N 30/6095 73/61.52 |
| 2012/0016597 A1* | 1/2012 | Sutan | G01N 30/8665 702/24 |
| 2013/0327126 A1* | 12/2013 | Graeffe | G01N 33/34 73/38 |
| 2016/0069845 A1 | 3/2016 | Fogwill et al. | |
| 2018/0155311 A1* | 6/2018 | Burger | A23L 33/10 |
| 2018/0252684 A1* | 9/2018 | Fogwill | G01N 30/7233 |
| 2018/0311596 A1* | 11/2018 | Tarafder | G01N 30/28 |
| 2019/0111376 A1* | 4/2019 | Fogwill | B01D 15/40 |
| 2019/0170710 A1* | 6/2019 | Fogwill | G01N 30/68 |
| 2019/0369061 A1* | 12/2019 | Fogwill | G01N 30/38 |

\* cited by examiner

Measure the flow rate of a $CO_2$-based mobile phase through a pressure-controlling component or a flow-controlling component of a chromatography system.

↓ —— 102

Using at least one processing unit, compare the measured flow rate to a specified threshold flow rate to determine a condition of the restrictor, where the threshold flow rate is computed based on a restrictor flow rate that is associated with a failure of the restrictor.

↓ —— 104

Using at least one processing unit, generate a signal, using the at least one processing unit, based on the condition of the restrictor, the signal including instructions to replace the restrictor in response to the condition of the restrictor being indicated as a failure.

Set a mobile phase flow rate of a $CO_2$-based mobile phase through the chromatography system to a specified value.

↓ —— 152

Measure a pressure of the chromatography system.

↓ —— 154

Using at least one processing unit, compare the measured pressure to a specified threshold pressure to determine a condition of the restrictor, where the threshold pressure is associated with a failure of the restrictor

↓ —— 156

Generate a signal, using the at least one processing unit, based on the condition of the restrictor, the signal including instructions to replace the restrictor in response to the condition of the restrictor being indicated as a failure

Receive data indicative of a measurement of a measurement of the flow rate of a $CO_2$-based mobile phase through a pressure-controlling component or a flow-controlling component of a chromatography system.

↓ — 302

Compare the measured first flow rate to a specified threshold flow rate to determine a condition of the restrictor, where the threshold flow rate is computed based on a restrictor flow rate that is associated with a failure of the restrictor.

↓ — 304

Generate a signal, using the at least one processing unit, based on the condition of the restrictor, the signal including instructions to replace the restrictor in response to the condition of the restrictor being indicated as a failure.

Cause the chromatography system to set a mobile phase flow rate of a $CO_2$-based mobile phase through the chromatography system to a specified value.

↓ — 352

Receive data indicative of a measurement a pressure of the chromatography system.

↓ — 354

Compare the measured pressure to a specified threshold pressure to determine a condition of the restrictor, where the threshold pressure is associated with a failure of the restrictor.

↓ — 356

Generate a signal based on the condition of the restrictor, the signal including instructions to replace the restrictor in response to the condition of the restrictor being indicated as a failure.

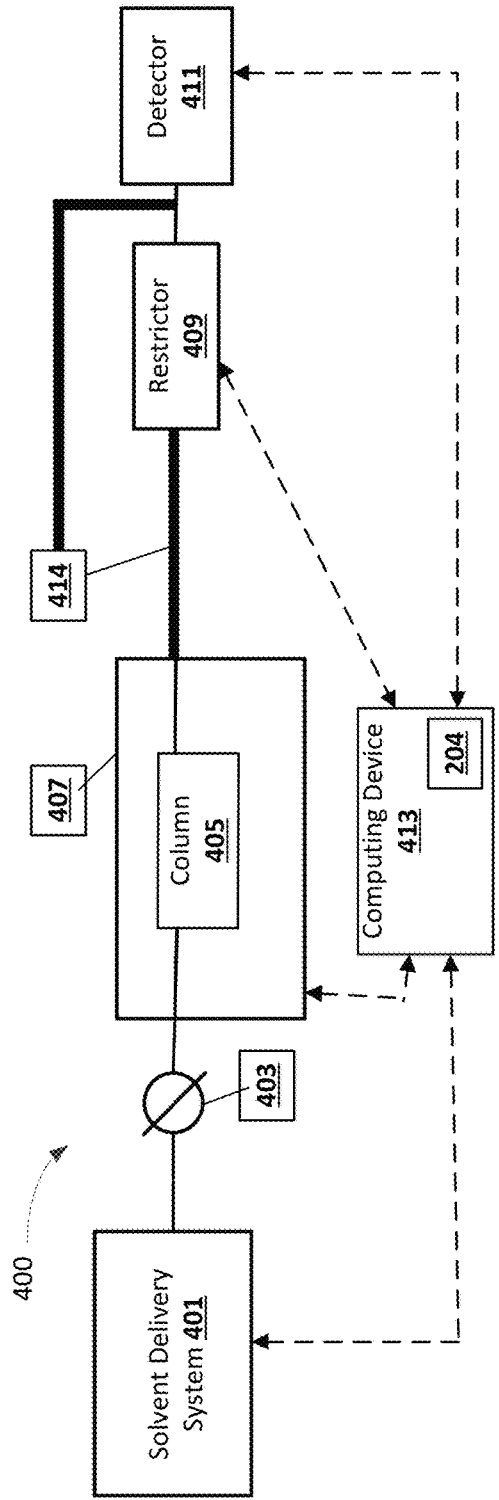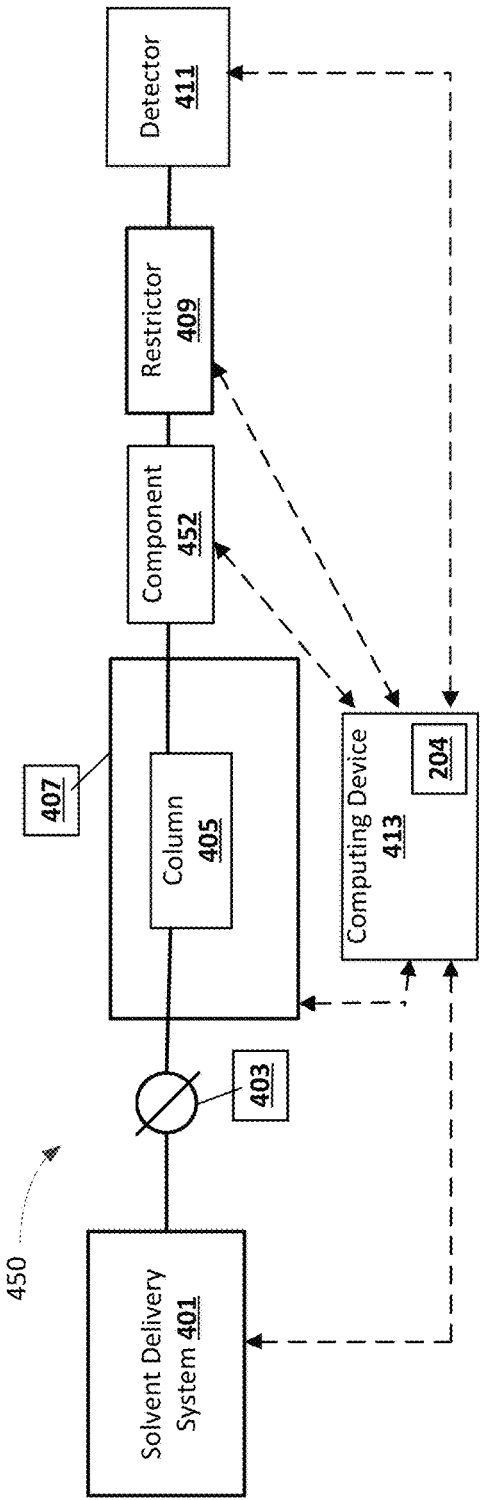

SYSTEM AND METHOD FOR DIAGNOSING A CONDITION OF A RESTRICTOR

RELATED APPLICATION

This application claims priority to U.S. Provisional Application No. 62/571,440, filed on Oct. 12, 2017, which is incorporated herein by reference in its entirety.

FIELD OF THE TECHNOLOGY

The present disclosure generally relates to pressurized fluid systems used in chromatography. In particular, the present disclosure relates to systems and methods for diagnosing the state or condition of one or more restrictors used to within fluid flow path of the chromatography system.

BACKGROUND

Chromatography involves the flowing of a mobile phase over a stationary phase to effect separation. To speed-up and enhance the efficiency of the separation, pressurized mobile phases are introduced. Carbon dioxide based chromatographic systems use $CO_2$ as a component of the mobile phase flow stream, and the $CO_2$ based mobile phase is delivered from pumps and carried through the separation column as a pressurized liquid. The $CO_2$ based mobile phase is used to carry components of the analytes in a sample through the chromatography column to the detection system.

Chromatography systems often use a restrictor to interface to the detection system. The restrictor can be used to maintain system pressure and to regulate or introduce a portion of the mobile phase flow to the detection system.

SUMMARY

A failed or failing restrictor can adversely affect and diminish the desired performance of the chromatography systems. Technology for monitoring and diagnosing the condition of restrictors while in use in the chromatography systems would be beneficial and highly desirable. It can be difficult to identify a failing restrictor. For example, when analyte or matrix deposits on the interior walls of the restrictor causing a change in the restriction—not a complete obstruction, but a partial or increasing obstruction. In a split-flow interface, the deposits along restrictor interior walls results in a lower amount of flow directed to the detector. In a full-flow interface, the change in restriction often results in unstable system pressures or varying detector response (i.e. changing pressure-controlling fluid flow in a pressure-controlling fluid interface). Thus, even though the restrictor is failing, the restrictor degradation may not be immediately evident because fluid will still be exiting the restrictor. However, in this case, sensitivity will be reduced.

Technology disclosed herein covers various methods to determine or to identify a failing or degrading restrictor. In some embodiments, an alarm is activated to trigger replacement (e.g., manual replacement by a user or automated replacement) to a new, uncompromised restrictor. Examples of the present technology are directed to systems, methodologies, apparatus, and kits for diagnosing the condition of a restrictor element in a chromatography system, including identifying a failure of the restrictor used in $CO_2$-based chromatography systems, i.e., a chromatography system in which the mobile phase includes $CO_2$.

In one aspect, the technology relates to a method for identifying a failure of a restrictor of a chromatography system. The method of this aspect of the technology includes: (a) measuring a first flow rate of a $CO_2$-based mobile phase through a component of the chromatography system; (b) using at least one processing unit, comparing the measured first flow rate to a specified threshold flow rate to determine a condition of the restrictor, the threshold flow rate being computed based on a restrictor flow rate that is associated with a failure of the restrictor; and (c) generating a signal, using the at least one processing unit, based on the condition of the restrictor, the signal comprising instructions to replace the restrictor in response to the condition of the restrictor being indicated as a failure.

In another aspect, the technology relates to a method for identifying a failure of a restrictor of a chromatography system. The method comprising: (a) setting a mobile phase flow rate and composition of a $CO_2$-based mobile phase through the chromatography system to a specified value; (b) measuring a pressure of the chromatography system; (c) using at least one processing unit, comparing the measured pressure to a specified threshold pressure to determine a condition of the restrictor, the threshold pressure being associated with a failure of the restrictor; and (d) generating a signal, using the at least one processing unit, based on the condition of the restrictor, the signal comprising instructions to replace the restrictor in response to the condition of the restrictor being indicated as a failure.

In a further aspect, the technology relates to a kit for a chromatography system with independent control of system pressure and flow rate of a $CO_2$-based mobile phase. The kit includes: at least one restrictor; and at least one processing unit in communication with the at least one restrictor. The at least one processing unit including processor-executable instructions to: (a) receive data indicative of a measurement of a first flow rate of a $CO_2$-based mobile phase through a pressure-controlling component or a flow-controlling component of the chromatography system; (b) compare the measured first flow rate to a specified threshold flow rate to determine a condition of the restrictor, the threshold flow rate being computed based on a restrictor flow rate that is associated with a failure of the restrictor; and (c) generate a signal based on the condition of the restrictor. The generated signal including instructions to replace the restrictor in response to the condition of the restrictor being indicated as a failure. It is noted that in some embodiments, the restrictors in the system include, send, and/or emit identifying data such that the signal generated can also include information on the location of and/or description of the particular restrictor that has failed.

In another aspect, the technology relates to a kit for a chromatography system with independent control of system pressure and flow rate of a $CO_2$-based mobile phase. The kit includes: at least one restrictor; and at least one processing unit in communication with the at least one restrictor. The at least one processing unit comprising processor-executable instructions to: (a) cause the chromatography system to set a mobile phase flow rate and composition of a $CO_2$-based mobile phase through the chromatography system to a specified value; (b) receive data indicative of a measurement of a pressure of the chromatography system; (c) compare the measured pressure to a specified threshold pressure to determine a condition of the restrictor, the threshold pressure being associated with a failure of the restrictor; and (d) generate a signal based on the condition of the restrictor. The generated signal including instructions to replace the restrictor in response to the condition of the restrictor being indicated as a failure. In some embodiments, the restrictors in the system include, send, and/or emit identifying data such that the signal generated can also include information on the location of and/or description of the particular restrictor that has failed The above aspects of the technology provide numerous advantages. For example, systems and methods of the present technology provide better sensitivity as compared to conventional systems and methods. In particular, conventional systems do not have restrictor degradation feedback and monitoring. As a result, restrictors in conventional systems may not be replaced as often as required, often resulting in poor sensitivity. Conversely, restrictors may be replaced unnecessarily as scheduled maintenance items, thereby increasing cost of operation. In addition, some embodiments provide not only the advantage of monitoring and indicating (e.g., sounding an alarm) restrictor decreased performance, but also include automated replacement of the failing restrictor. This feature eliminates possible downtown in operations as human intervention is no longer needed.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A-1B show flowcharts of example methodologies, according to principles of the present disclosure.

FIGS. 3A-3B show flowcharts of example methodologies, according to principles of the present disclosure.

FIGS. 4A-8B are block diagrams illustrating example $CO_2$-based chromatography systems, according to principles of the present disclosure.

Figure 2:
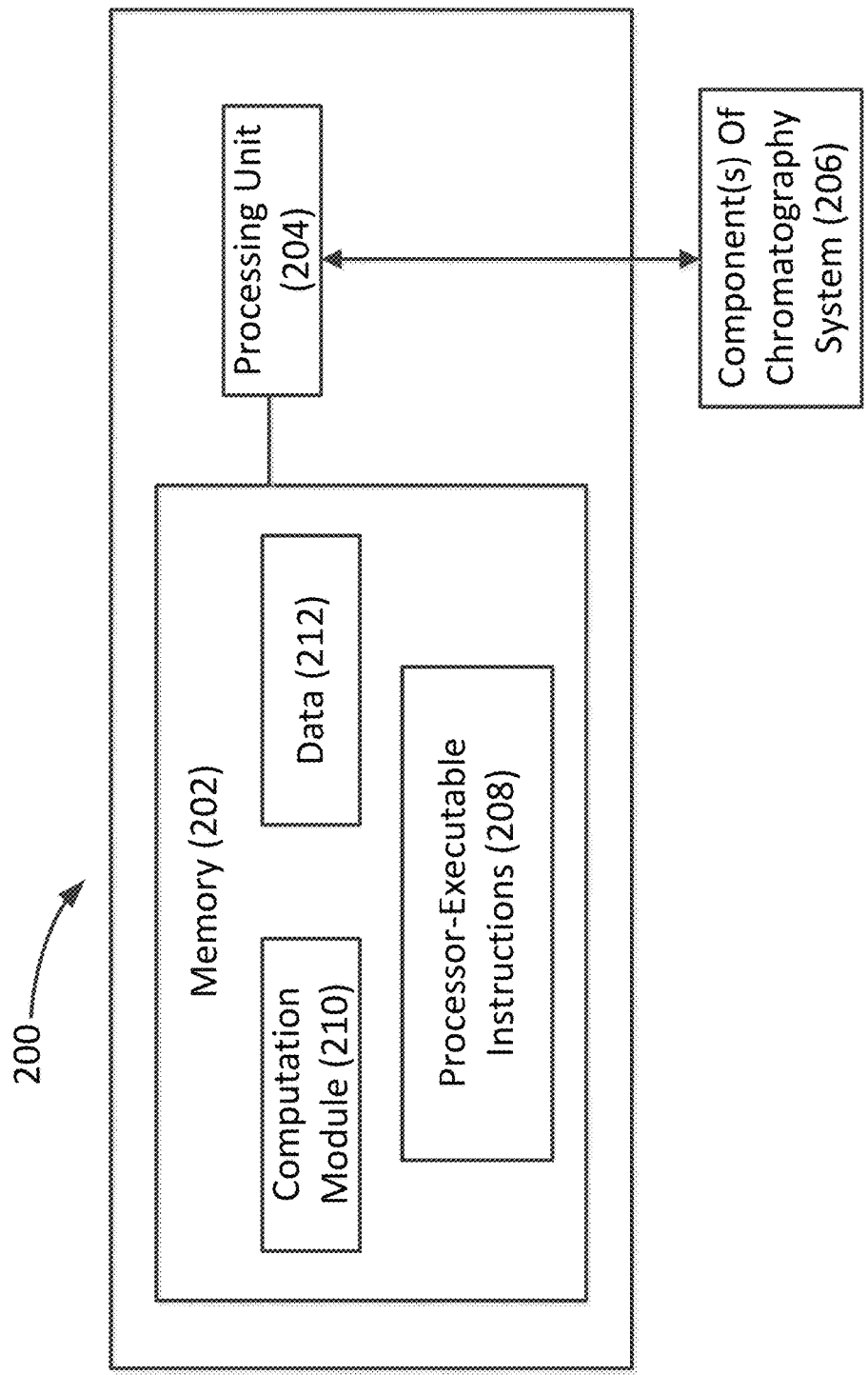
FIG. 2 shows an example apparatus that can be used to perform example processes and computations, according to principles of the present disclosure.

The features and advantages of the present disclosure will become more apparent the detailed description set forth below when taken in conjunction with the drawings.

DETAILED DESCRIPTION

Following below are more detailed descriptions of various concepts related to, and embodiments of, methodologies, apparatus and systems for diagnosing the condition of a restrictor element in a chromatography system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

A "restrictor" herein refers to a component used in a chromatography system that is used to regulate or decrease flow. In some embodiments a restrictor is also used to interface to a detection component. Non-limiting examples of restrictors include a length of straight, small internal diameter tubing, a tapered restrictor, a converging-diverging restrictor, an integral restrictor, a fritted restrictor, or a thermally modulated variable restrictor.

Chromatography systems are widely used for separating a sample including analytes into its constituents. Due to their low cost and ease of manufacture, restrictors are implemented in many types of chromatography systems. The restrictor can be used to maintain system pressure in the chromatography system and introduces a portion of the mobile phase flow to a detector. For example, the restrictor can be used to control the interface to a low-pressure detection component, such as but not limited to a mass spectrometry (MS) detection system, an evaporative light scattering detection system, or a flame ionization (FID) detection system.

The performance of the restrictors should be monitored because they can be prone to greatly reduced performance and even failure. Restrictors can fail through several different types of mechanisms. For example, a failure mechanism can result from a solid particle becoming lodged into the restrictor orifice, causing complete blockage. A failed restrictor according to this failure mechanism can be easy to diagnose. Since very little or no fluid would exit this failed restrictor, the detector response would be very low, or the chromatography system would exhibit very high or uncontrolled pressures. As another example, a second type of failure mode can result from analyte or matrix deposits on the interior walls of the restrictor causing a change in the restriction performance of the restrictor, but not a complete obstruction. In a chromatography system having a split-flow interface, the increasing deposition of the analyte or matrix deposits can result in a lower amount of flow directed to the detector. In a chromatography system having a full-flow interface, the change in restriction performance of the restrictor can result in unstable system pressures or varying detector response, i.e., changing pressure-controlling fluid flow in a pressure-controlling fluid interface. In this example failure mode, the restrictor degradation may not be immediately diagnosed because fluid would still be exiting the restrictor. That is, this second type of failure mechanism can be more difficult to diagnose. However, the sensitivity and performance of the performance of the chromatography system would be reduced.

A failed or failing restrictor can adversely affect and diminish the desired performance of the chromatography systems. Technology for monitoring and diagnosing the condition of restrictors during use in the chromatography systems would be beneficial and highly desirable.

Example systems, methodologies, and apparatus described herein provides for diagnosing the condition of a restrictor element in a chromatography system, including identifying a failure of the restrictor. In response to a restrictor being diagnosed as exhibiting reduced performance or in a failure mode, the example systems, methodologies, and apparatus can be configured to generate an alert to cause replacement of the restrictor. In a non-limiting example, the disclosure describes systems, methodologies, and apparatus that can be used for identifying a failing restrictor when interfacing a chromatography system to low-pressure detection. This disclosure also describes systems, methodologies, and apparatus that can be used for identifying a failing restrictor in order to trigger a signal to cause its replacement. As non-limiting examples, the signal can be an audible alarm, a visual display, or a graphic icon, or other signal to indicate a failing restrictor to be replaced. The visual display can include a change of visual alert (such as but not limited to a color indicator), a text or other transmitted message. The graphic icon can include a graphic rendered using a configured graphic user interface.

The example systems, methodologies, and apparatus can be used to provide feedback as to when a restrictor in a chromatography system is failing. Without such feedback, the restrictor may not be replaced as often as required, often resulting in poor sensitivity.

In a first aspect, non-limiting example systems, methodologies, and apparatus described herein can be used for diagnosing a condition of a restrictor of a chromatography system with independent control of system pressure and flow rate of a $CO_2$-based mobile phase, based on measurements of flow rate. FIG. 1A shows a flowchart of an example method according to this first aspect. As shown in block 102, example systems, methodologies, and apparatus can be configured to measure a first flow rate of a $CO_2$-based mobile phase. This measurement can be a direct measurement, wherein the flow rate is measured on a restrictor side of the system (i.e., after the column in the system) or, alternatively, the measurement could occur downstream of the restrictor on the restrictor side, and to determine the first flow rate, the measured flow rate would be subtracted from the pump flow rate. The measurement may occur through a pressure-controlling component or a flow-controlling component of the chromatography system. Alternatively the measurement may occur on either side of the restrictor or both sides. As shown in block 104, at least one processing unit is used to compare the measured first flow rate to a specified threshold flow rate to determine the condition of the restrictor. In an example, the threshold flow rate can be computed based on a restrictor flow rate that is associated with a failure of the restrictor. As shown in block 104, the example systems, methodologies, and apparatus is configured to generate a signal, using the processing unit(s), based on the condition of the restrictor. In response to the condition of the restrictor being indicated as a failure, the example signal can include instructions to cause replacement of the restrictor.

In any example of FIG. 1A, the pressure-controlling component can be a pressure-controlling fluid interface or a thermally-modulated variable restrictor.

In a non-limiting example of FIG. 1A where the chromatography system includes a split-flow interface, the pressure-controlling component can be a backpressure regulator (BPR). The restrictor is coupled to a leg of the split-flow interface. The flow rate can be measured as a BPR flow rate of the $CO_2$-based mobile phase through the backpressure regulator during operation of the chromatography system at a specified pressure and/or at a specified composition and/or at a specified mobile phase flow rate. The flow through the restrictor can be calculated as the BPR flow rate subtracted from the combined flow rate of one or more pumps (e.g. combined flow rate of a $CO_2$ pump and a modifier pump).

In a non-limiting example of FIG. 1A, the flow rate of the restrictor can be measured using a low-volume flow meter. In such a chromatography system, the low-volume flow meter would be disposed in the chromatographic flow path of the analyte. Therefore, the low-volume flow meter should be of a low internal fluidic volume so as to cause low or no dispersion of the analyte band (peak) as the analyte passes through the chromatography system (i.e., the low or no peak broadening or peak asymmetry).

In any example of FIG. 1A, the flow rate can be measured as a mass flow rate. Mass flow rate can be calculated from a measured volumetric flow rate and density (i.e., temperature and pressure measurements).

In a second aspect, non-limiting example systems, methodologies, and apparatus described herein also can be used for diagnosing a condition of a restrictor of a chromatography system with independent control of system pressure and flow rate of a $CO_2$-based mobile phase based on pressure measurements. FIG. 1B shows a flowchart of an example method according to this second aspect. As shown in block 152, example systems, methodologies, and apparatus are configured to set the mobile phase flow rate of a $CO_2$-based mobile phase through the chromatography system to a specified value. As shown in block 154, the pressure of the chromatography system is measured. As shown in block 156, at least one processing unit is used to compare the measured pressure to a specified threshold pressure to determine the condition of the restrictor. In an example, the threshold pressure is associated with a failure of the restrictor. As shown in block 158, the example systems, methodologies, and apparatus is configured to generate a signal, using the processing unit(s), based on the condition of the restrictor. In response to the condition of the restrictor being indicated as a failure, the example signal can include instructions to cause replacement of the restrictor.

In an example of FIG. 1B, the restrictor can be a fixed restrictor. The chromatography system can include a first pressure-controlling component and a second component positioned downstream of the first component. The second component can be a second pressure-controlling component and/or a flow-controlling component. This example implementation can further include operating the chromatography system without using the first pressure-controlling component, and while operating the second component, prior to measuring the pressure of the chromatography system. Non-limiting example implementations can further include disabling the flow rate of the pressure-controlling component of the chromatography system and measuring the pressure generated using the restrictor, or disabling a BPR of the chromatography system and measuring the pressure generated through a restrictor positioned downstream of the BPR.

In an example of FIG. 1B where the restrictor is a thermally-modulated variable restrictor, the chromatography system can be operated with the $CO_2$-based mobile phase set to a known composition and flow rate. This example implementation can further include measuring the pressure of the chromatography system at a specified temperature of the thermally-modulated variable restrictor.

In an example of FIG. 1B where the chromatography system includes a pressure-controlling fluid interface, the pressure of the chromatography system can be determined based on a measurement of the pressure of the $CO_2$-based mobile phase through the restrictor.

FIG. 2 shows a non-limiting example apparatus 200 that can be used to implement an example method for monitoring and diagnosing the condition of a restrictor according to the principles described herein. The apparatus 200 includes at least one memory 202 and at least one processing unit 204. The at least one processing unit 204 is communicatively coupled to the at least one memory 202 and also to at least one component of a chromatography system 206.

The at least one memory 202 is configured to store processor-executable instructions 208 and a computation module 210. In an example method as described in connection with FIG. 1A, the at least one processing unit 204 can execute processor-executable instructions 208 stored in the memory 202 to cause the computation module 220 to compare the measured first flow rate to a specified threshold flow rate to determine the condition of the restrictor. The computation module also can be used to compute a threshold flow rate based on data indicative of a restrictor flow rate that is associated with a failure of a restrictor (including based on data 212 stored on the memory 202). In an example method as described in connection with FIG. 1B, the at least one processing unit can execute processor-executable instructions 208 to cause the computation module 220 to compare the measured pressure to a specified threshold pressure to determine the condition of the restrictor. In this example, the computation module also can be used to compute a threshold pressure based on data 212 indicative of a failure of the restrictor (including based on data 212 stored on the memory 202).

The at least one processing unit 204 is also configured to execute processor-executable instructions 208 stored in the memory 202 at least to generate a signal based on the condition of the restrictor. For example, in response to the condition of the restrictor being indicated as a failure, the example signal can include instructions to replace the restrictor. The at least one processing unit 204 can be used to execute processor-executable instructions 208 to transmit (or otherwise communicate) the signal and/or the instructions to replace the restrictor to a user or to at least one component of the chromatography system 206. The at least one processing unit 204 also may be used to execute processor-executable instructions 208 to control the memory 202 to store data from the computation(s).

Example systems, methodologies, and apparatus according to the first aspect can provide a kit for use with a chromatography system, for identifying the condition of the restrictor element based on flow rate measurements. This example kit includes at least one restrictor and at least one processing unit that is configured to communicate with at least one component of the chromatography system. The example processing unit can include processor-executable instructions to cause execution of the processes and computations of an example method as described in connection with the flowchart of FIG. 3A. As shown in FIG. 3A, the processor-executable instructions include receiving data indicative of a measurement of a first flow rate of the $CO_2$-based mobile phase through a pressure-controlling component or a flow-controlling component of the chromatography system (block 302), comparing the measured first flow rate to a specified threshold flow rate to determine a condition of the restrictor, where the threshold flow rate is computed based on a restrictor flow rate that is associated with a failure of the restrictor (block 304), and generating a signal based on the condition of the restrictor (block 306). (As described above in connection with FIG. 1A, the data can be measured at the location of the pressure-controlling or flow-controlling component or upstream or downstream or both of the component.) The example signal can include instructions to cause replacement of the restrictor in response to the condition of the restrictor being indicated as a failure.

In an example kit according to FIG. 3A, the processing unit can further execute processor-executable instructions to receive data that identifies the pressure-controlling component and the flow-controlling component of the chromatography system. For example, the identifying data can include the operating characteristics and the type of the pressure-controlling component. Similarly, the identifying data can include the operating characteristics and the type of the flow-controlling component.

At least one processing unit of the example kit according to FIG. 3A can be programmed further to execute processor-executable instructions in response to the identifying data received. For example, in response to receiving data that identifies the pressure-controlling component as a backpressure regulator and the flow-controlling component as a split-flow interface coupled to the restrictor, the at least one processing unit can be programmed further to execute processor-executable instructions to cause the chromatography system to operate the chromatography system at a specified pressure and a specified composition, and measure the first flow rate through the backpressure regulator. As another example, in response to receiving data identifying the pressure-controlling component as a pressure-controlling interface, the at least one processing unit can be programmed further to execute processor-executable instructions to cause the chromatography system to set a second flow rate of the $CO_2$-based mobile phase of known composition through the chromatography system to a specified value, and measure the first flow rate through the pressure-controlling interface.

The example kit according to this first aspect can include an apparatus 200 as shown in FIG. 2 to perform the processes and computations described in connection with FIG. 3A. For example, the at least one processing unit 204 of apparatus 200 can be programmable to execute the processor-executable instructions 208 stored in the memory 202 to cause the computation module 220 to perform one or more of the processes and computations described in connection with FIG. 3A. The data 212 can include the data indicative of the specified threshold flow rate.

Example systems, methodologies, and apparatus according to the second aspect can provide a kit for use with a chromatography system for identifying the condition of the restrictor element based on pressure measurements. This example kit also includes at least one restrictor and at least one processing unit that is configured to communicate with at least one component of the chromatography system. The example processing unit can include processor-executable instructions to cause execution of the processes and computations of an example method as described in connection with the flowchart of FIG. 3B. As shown in FIG. 3B, the processor-executable instructions include setting a mobile phase flow rate and composition of a $CO_2$-based mobile phase through the chromatography system to a specified value (block 352), and receiving data indicative of a measurement of a pressure of the chromatography system (block 304). The processor-executable instructions also include comparing the measured pressure to a specified threshold pressure to determine a condition of the restrictor, where the threshold pressure is associated with a failure of the restrictor (block 306), and generating a signal based on the condition of the restrictor (block 308). The example signal can include instructions to cause replacement of the restrictor in response to the condition of the restrictor being indicated as a failure.

In an example kit according to FIG. 3B, the processing unit can further execute processor-executable instructions to receive data that identifies the pressure-controlling component and the at least one restrictor of the chromatography system. For example, the identifying data can include the operating characteristics and the type of the pressure-controlling component. Similarly, the identifying data can include the operating characteristics and the type of the restrictor(s).

At least one processing unit of the example kit according to FIG. 3B can be programmed further to execute processor-executable instructions in response to the identifying data received. For example, in response to receiving data that identifies the pressure-controlling component as a first and a second backpressure regulator, and also identifies the at least one restrictor as a fixed restrictor, the at least one processing unit can be programmed further to execute processor-executable instructions to cause the chromatography system to operate the chromatography system without using the first backpressure regulator, while operating the second backpressure regulator, prior to measuring the pressure of the chromatography system. As another example, in response to receiving data identifying the at least one restrictor as a thermally-modulated variable restrictor, the at least one processing unit can be programmed further to execute processor-executable instructions to cause the chromatography system to set the temperature of the thermally-modulated variable restrictor to a specified temperature, and to measure the pressure at the specified temperature of the thermally-modulated variable restrictor.

The example kit according to this second aspect can include an apparatus 200 as shown in FIG. 2 to perform the processes and computations described in connection with FIG. 3B. For example, the at least one processing unit 204 of apparatus 200 can be programmable to execute the processor-executable instructions 208 stored in the memory 202 to cause the computation module 220 to perform one or more of the processes and computations described in connection with FIG. 3B. The data 212 can include the data indicative of the specified threshold pressure.

The values for the specified threshold flow rate and/or the specified threshold pressure can be computed based on measurement data from the desired performance range of a given chromatography system that includes a restrictor component, for a mobile phase flow and composition set to a known value. For example, the value for the specified threshold flow rate can be computed based on restrictor components that are calibrated (or otherwise characterized) such that the nominal restrictor flow rate is known for a given condition of the restrictor. As another example, the value for the specified threshold pressure can be computed based on restrictor components that are calibrated (or otherwise characterized) according to the expected system pressure for a given condition of the restrictor. As yet another example, the values for the specified threshold flow rate and/or the specified threshold pressure can be computed based on data from measurements of the performance of a chromatography system that includes each of a series of restrictor components at known conditions, i.e., restrictor components that are characterized as to the stage of degradation, up to and including restrictor failure. Measurement data indicative of the performance of the chromatography system can be collected for each run of a chromatography system that includes each of the series of restrictor components at known conditions. As an example, the chromatography system can include one or more sensors to measure the flow rate and/or pressure to provide the measurement data used for computing the specified threshold flow rate and/or the specified threshold pressure.

The example systems, methodologies, and apparatus, including the kits, described herein are applicable to many different types of chromatography systems that include at least one restrictor component. While the example systems, methodologies, apparatus and kits are described herein relative to certain types and configurations of chromatography systems, they apply to many different types of chromatography systems, such as but not limited to carbon dioxide-based chromatography systems (such as, for example Ultra-Performance Convergence Chromatography™ (UPC²™) chromatography systems (Waters Corporation, Milford, Mass.)), supercritical fluid chromatography (SFC) systems, high performance liquid chromatography (HPLC) systems, ultra-high performance liquid chromatography (UHPLC), gas chromatography (GC) systems, dense GC systems, solvating GC separation systems, and supercritical fluid extraction (SFE) systems.

FIG. 4A is a block diagram illustrating an example $CO_2$-based chromatography system 400 including a restrictor component. In this example, a solvent delivery system 401 including one or more pumps (not shown) is used to draw a $CO_2$ mobile phase from a $CO_2$ container, through a sample injector 403, to the chromatography column 405 (located within a column oven 407). A restrictor 409 is located downstream of the chromatography column 407 and upstream of a detector 411. Fluidically coupled to the solvent delivery system 401 are one or more sources of solvents that are used during the course of a chromatographic run. From these sources of solvent, the solvent delivery system 401 draws a mobile phase fluid (which also can be referred to as a compressible mobile phase fluid, such as a mobile phase which includes $CO_2$) and moves the mobile phase to the sample injector 403. The chromatographic separation occurs under predetermined pressure conditions, which are either static or programmed dynamic pressure conditions. The solvent delivery system 401 can operate in a constant-pressure mode or in a constant-flow mode. In the constant-pressure mode, the solvent delivery system 401 produces the system pressure in the chromatography system 400 with one or more pumps (not shown) in accordance with, for example, a density program. The restrictor 409 can be used to control the mobile phase flow rate when the solvent delivery system 401 is in the constant-pressure mode. When in the constant-flow mode, the system 400 provides a set flow rate of solvent. This flow rate can be programmable. When the solvent delivery system 401 is in the constant-flow mode, the restrictor 409 can be used to control the system pressure.

The sample injector 403 is in fluidic communication with a sample source from which the sample injector 403 acquires a sample (i.e., the material under analysis) and introduces the sample to the mobile phase arriving from the solvent delivery system 401. Non-limiting examples of samples include complex mixtures of proteins, protein precursors, protein fragments, reaction products, and other compounds.

The chromatography column 407 is adapted to separate the various components (or analytes) of the sample from each other at different rates as the mobile phase passes through, and to elute the analytes (still carried by the mobile phase) from the chromatography column 407 at different times. Non-limiting examples of the chromatography column 407 include a variety of sizes (e.g., preparative, semi-preparative, analytical-scale (e.g., 4.6 mm ID), or capillary-scale packed-bed columns or open tubular columns) and a variety of preparations, such as but not limited to is metallic, fused silica, or polymeric tubes, or in metallic, ceramic, silica, glass, or polymeric microfluidic platforms or substrates of various internal dimensions.

As shown in FIG. 4A, a computing device 413 including at least one processing unit 204 is configured to communicate with at least one component of the chromatography system. For example, the computing device 413 can be configured to communicate with one or more of the solvent delivery system 401, the column oven 407, or the detector 411. The computing device may also be configured to communicate with one or more components disposed at either or both regions 414 of the chromatography system, such as but not limited to one or more pressure-controlling components, one or more sensors, and/or one or more meters (such as but not limited to a low-volume flow meter).

In examples, data, and/or commands for control, and/or instructions can be communicated between the computing device 413 and at least one component of the chromatography system. For example, the computing device 413 can be used to execute processor-executable instructions to control the pressure, and/or temperature, and/or mobile phase flow rate, and/or mobile phase composition in one or more components of the chromatography system. As another example, the computing device 413 can be used to execute processor-executable instructions to run a density program by which the computing device 413 controls the system pressure produced by the solvent delivery system 401 during the course of the chromatographic run, or run a gradient schedule by which the computing system 413 controls the mobile phase composition produced by the solvent delivery system 401. As yet another example, the computing device 413 can be used to execute processor-executable instructions to control the temperature of a component of the chromatography system, such as but not limited to the column oven 407 and/or the restrictor 409 (including a thermally modulated variable restrictor).

In an example where the restrictor 409 is a thermally modulated variable restrictor, the thermally modulated variable restrictor can be used to decouple the mass flow rate of the mobile phase from the system pressure. For example, when the solvent delivery system 401 is used to control the system pressure, the thermally modulated variable restrictor can use temperature to restrict and control the mass flow of the mobile phase through the chromatography column 405. Alternatively, when the solvent delivery system 401 controls the mass flow of the mobile phase (in the constant-flow mode), the thermally modulated variable restrictor can use temperature to control the system pressure. In non-limiting examples, the thermally modulated variable restrictor can be fashioned as one or more sections of tubing or as a channel in a metallic, ceramic, silica, glass, or polymeric microfluidic device. An example thermally modulated variable restrictor can be made of metal, fused silica, silica, glass, or polymeric tubing or microfluidic devices of various geometries and cross sectional aspect ratios. Example system 400 may also include a temperature controller in communication with the thermally modulated variable restrictor, to determine the temperature of the mobile phase within the restrictor 409 and, if necessary, to adjust the temperature applied to the heated region of the thermally modulated variable restrictor to attain a target pressure. In an example, the temperature controller can include an active feedback loop with a pressure transducer disposed in the fluidic path downstream of the chromatography column 405 (but upstream of the variable restrictor) for closed-loop control.

The example detector 411 can be a gas chromatography type detector, such as but not limited to a flame ionization detector (FID) and a mass spectrometer. Other example detectors 411 include, but are not limited to, a mass spectrometer and an evaporative light scattering detector. The output of the detector 411 depends on the type of detector, and can be, for example, a voltage signal or a current that is applied, for example, to an X-Y plotter or some type of chart recorder, which graphs the detector output over time, or is supplied as input to a data system, such as included in computing device 413. Other types of detectors can be used in connection with the restrictors described herein.

The computing device 413 including the at least one processing unit 204 can be used to execute the example processes and computations described in connection with any of FIG. 1A, 1B, 3A, or 3B. An example kit as described herein that includes a restrictor and the at least one processing unit may be coupled with the an example chromatography system to provide the system shown in FIG. 4A. For example, the restrictor of the kit may be used to substitute the restrictor of an existing chromatography system, and the at least one processing device may be used to execute the processes and computations described in connection with any of FIG. 1A, 1B, 3A, or 3B, using the chromatography system.

As shown in FIG. 4A, the example chromatography system 400 can include one or more additional components in either or both regions 414 (i.e., regions 414 are indicated by a thicker line in FIG. 4A). FIG. 4B shows an example chromatography system 450 that includes at least one additional component 452 along with the other components described hereinabove in connection with FIG. 4A. The description of components and features in connection with FIG. 4A also apply to the equivalent components and features shown in FIG. 4B. In this example, the additional component 452 is positioned downstream of the chromatography column 405 and upstream of the restrictor 409. In other example, the additional component 452 can be positioned downstream of the restrictor 409 and upstream of the detector 411, or additional components 452 could be disposed in both positions. As non-limiting examples, additional component 452 can be, but is not limited to, one or more sensors, one or more backpressure regulators (or other pressure-controlling components or interface), one or more meters (such as but not limited to low-volume flow meters), or splitters. The one or more sensors can be used for measuring parameters such as but not limited to system pressure, gradient composition, temperature of the mobile phase, and mass flow rate. As shown in FIG. 4B, the computing device 413 including at least one processing unit 204 also can be configured to communicate with the additional component 452.

The example systems, methodologies, apparatus or kits described in connection with any of FIG. 1A, 1B, 2, 3A, or 3B also can be used to diagnose the condition of the restrictor element of a chromatography system that includes a pressure-controlling fluid interface. In such a chromatography system, measurement data for the flow rate of pressure-controlling fluid and/or measurement data for the restrictor pressure can be used in a computation to determine the condition of the restrictor element. Accordingly, the example processes and computations described in connection with any of FIG. 1A, 1B, 3A, or 3B can be used for diagnosing the condition of the restrictor. In a first example aspect, if the mobile phase flow and composition are set to known values, and the pressure-controlling fluid is flowing, the pressure-controlling fluid flow rate should be at an expected value. If and when the restrictor begins to plug, the flow rate of the pressure controlling fluid can be less than expected. Thus, the example processes and computations described in connection with any of FIGS. 1A and 3A can be used for diagnosing the condition of the restrictor using flow rate measurements, where the specified threshold flow rate can be computed based on a calibration of the expected pressure-controlling fluid flow rate based on the set mobile phase flow and composition. In a second example aspect, if the mobile phase flow and composition are set to known values, the restrictor should result in a known pressure. If the measured pressure is higher than expected, the restrictor may be becoming occluded. Thus, the example processes and computations described in connection with any of FIGS. 1B and 3B can be used for diagnosing the condition of the restrictor using pressure measurements, where the specified threshold pressure can be computed based on a calibration of the expected pressure based on the set mobile phase flow and composition.

In any of the example systems, methodologies, apparatus or kits herein, the at least one processing unit 204 is communicatively coupled to the at least one memory 202 and also to at least one component of a chromatography system (including chromatography system 206), to transmit and/or receive measurement data (such as but not limited to flow rate data, pressure data, and/or temperature data), perform database queries, and implement any other processes described herein, including the processes described in connection with any one or more of FIG. 1A, 1B, 2, 3A, 3B, 4A, or 4B.

In any of FIGS. 1A through 4B, the $CO_2$-based mobile phase may include a modifier in addition to the $CO_2$.

Non-limiting examples of variations of chromatography systems that include at least one restrictor are described in connection with the non-limiting examples of FIGS. 5-8B hereinbelow. The description of components and features of the chromatography systems in connection with FIGS. 4A and 4B also apply to the equivalent components and features described in connection with FIGS. 5-8B. The application of the example systems, methodologies, apparatus, and kits as described herein in connection with any of FIGS. 1A through 4B also can be applied to the non-limiting example chromatography systems of FIGS. 5-8B, as described in greater detail below.

Figure 5:
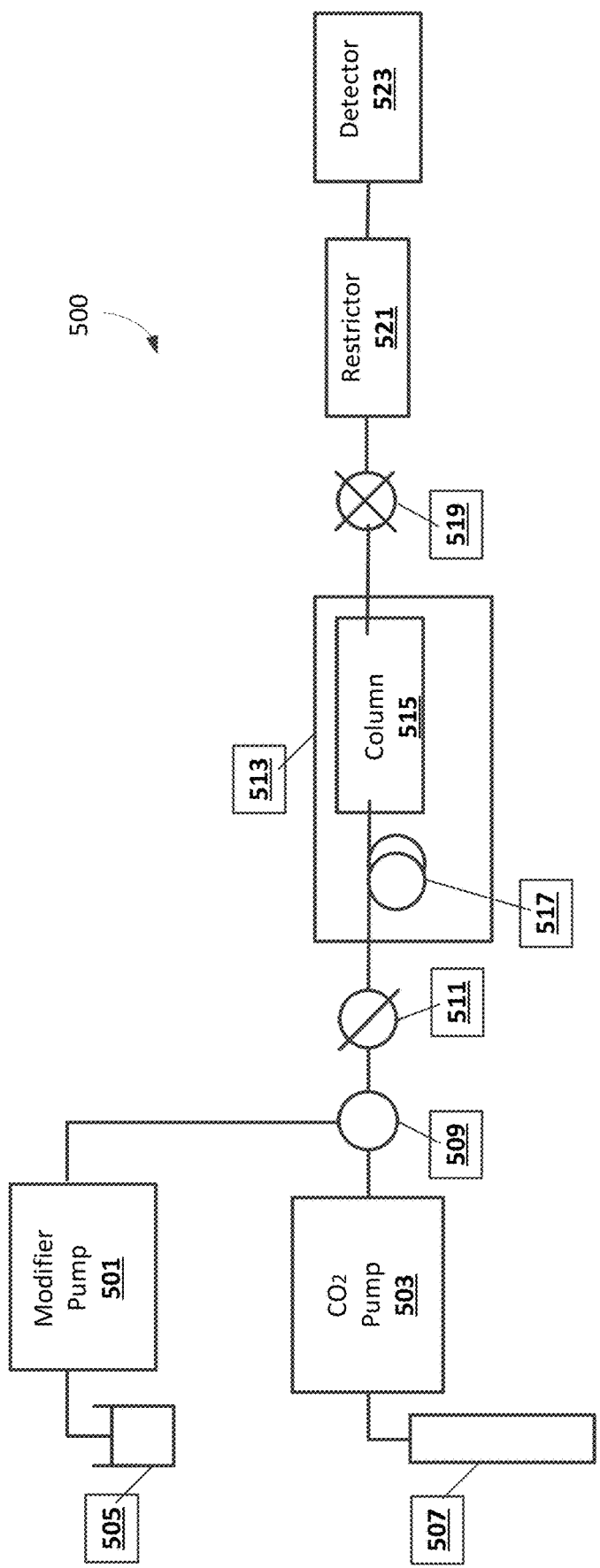

FIG. 5 is a block diagram illustrating an example $CO_2$-based chromatography system 500 including a restrictor component, which is configured as a full-flow $CO_2$-based chromatography system. This example chromatography system 500 illustrates an example architecture of a solvent delivery system for mixing a modifier with the $CO_2$, such as but not limited to a modifier (e.g., methanol) or a ternary additive (e.g., pH controllers)). As shown in FIG. 5, a modifier pump 501 is used to pump a liquid modifier from a solvent reservoir 505 to a chromatography column 515 through a mixer 509 and an injector 511. In parallel to the modifier pump 501, a $CO_2$ pump 503 is used to pump $CO_2$ from a $CO_2$ container 507 to the chromatography column 515 through the mixer 509 and injector 511. In this example, the column 515 is located within a column oven 513, which includes preheating elements 517. A pressure-controlling component 519 (such as but not limited to a backpressure regulator (BPR)) is located at the output of the chromatography column 515. The pressure-controlling component 519 can be used to control pressure within the column 515. A restrictor 521 is located downstream of the pressure-controlling component 519 and upstream of a detector 523. In some embodiments, a post-column addition pump or makeup fluid pump is used to aid in transporting analytes through the restrictor 521, assuring $CO_2$ and co-solvent miscibility, and/or enhancing detection. The addition of liquid can help to transport the analyte to detection, such as when operating with low percentages of co-solvent. The post-column addition/make-up pump is not shown in the figures, but as one of ordinary skill in the art would know could be easily added through the addition of a tee connector in the line extending downstream of the column 519 but before the pressure-controlling component 519. The tee connector would provide acess to a flow line connected to the make-up pump In a full-flow chromatography system, the change in restriction performance of the restrictor can result in unstable system pressures, or varying detector response, i.e., changing pressure-controlling fluid flow in a pressure-controlling fluid interface. Thus, the change in condition of the restrictor (such as restrictor degradation or failure) can be monitored based on a change in pressure or flow rate in the chromatography system 500. Accordingly, the example systems, methodologies, apparatus or kits described in connection with any of FIG. 1A, 1B, 2, 3A, or 3B can be used to diagnose the condition of the restrictor element. For example, measurement data indicating changes in the measured flow rate, as compared to a specified threshold flow rate, can be used for diagnosing the condition of the restrictor element of chromatography system 500 as described in connection with any of FIG. 1A, 2, or 3A. As another example, measurement data indicating changes in the measured pressure, as compared to a specified threshold pressure, can be used for diagnosing the condition of the restrictor element of chromatography system 500 as described in connection with any of FIG. 1B, 2, or 3B.

In some embodiments, the pressure-controlling component 519 is not a BPR, but some other type of pressure-controlling component. For example, in some embodiments, not shown, the pressure-controlling component consists of a pressure controlling fluid pump. In such an embodiment, a tee connector would be inserted into the flow line at the location indicated as 519 in FIG. 5, and a pressure controlling fluid pump would be connected to the system through the tee connector. This system would be considered a pressure controlling system instead of a full-flow system described above. In a pressure controlling system, the pumps are set to a known flow rate and composition and pressure downstream of the column 515 is monitored. Measurement data indicating a change in pressure at the tee location (i.e., downstream of the column 515 but before restrictor 521) from a known or expected value can be used for diagnosing the condition of the restrictor. Further, a deviation from the expected flow rate of the pressure-controlling pumps may indicate a failing restrictor.

Figure 6:
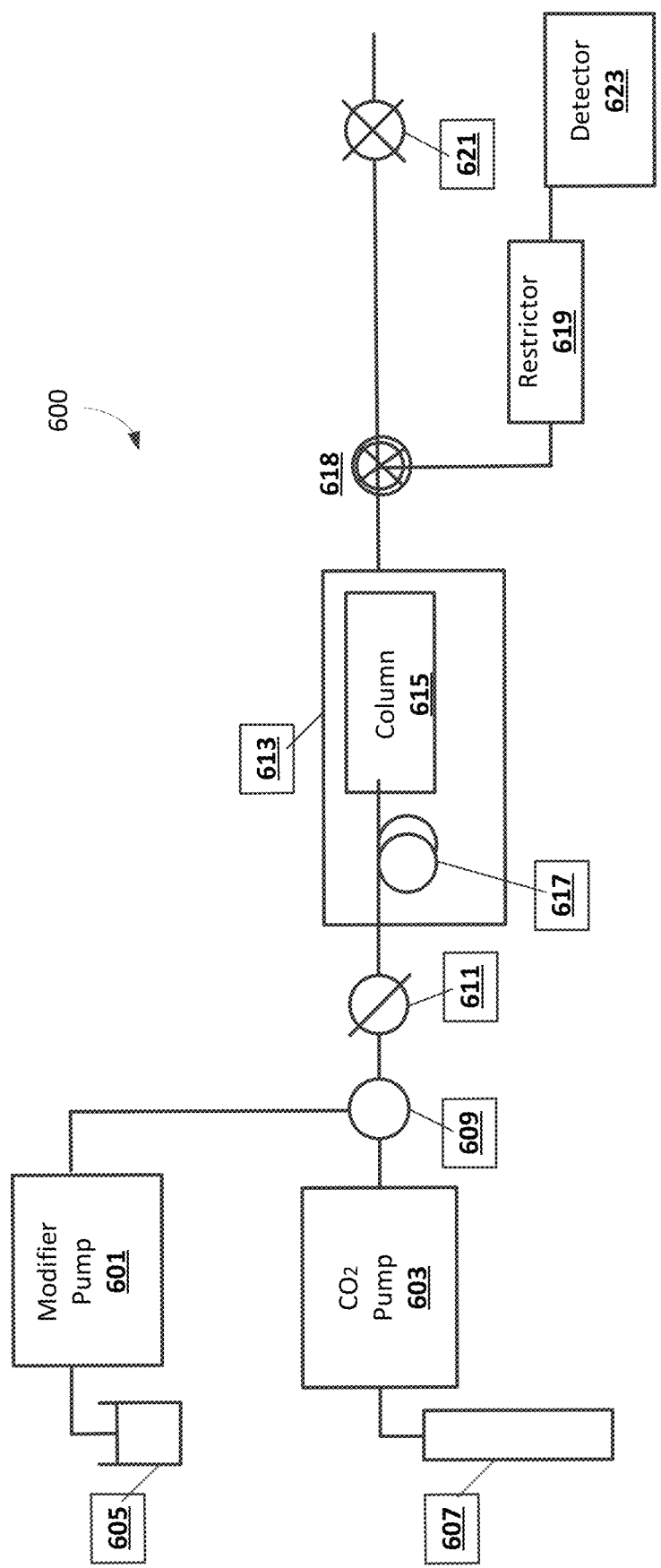

FIG. 6 is a block diagram illustrating an example $CO_2$-based chromatography system 600 including a restrictor component, which is configured as a split-flow $CO_2$-based chromatography system. This example chromatography system 600 illustrates an example architecture of a solvent delivery system for mixing a modifier with the $CO_2$, such as but not limited to a modifier (e.g., methanol) or a ternary additive (e.g., pH controllers)). As shown in FIG. 6, a modifier pump 601 is used to pump a liquid modifier from a solvent reservoir 605 to a chromatography column 615 through a mixer 609 and injector 611. A $CO_2$ pump 603 is used to pump $CO_2$ from a $CO_2$ container 607 to the chromatography column 615 through the mixer 609 and injector 611. In this example, the column 615 is located within a column oven 613, which includes preheating elements 617. The example chromatography system 600 achieves the splitting using a tee fitting 618 and a restrictor 619 in the mobile phase stream. The tee fitting 618 routes a majority portion of the mobile phase flow to a pressure-controlling component 621 for maintaining and controlling system pressure. Non-limiting examples of the pressure-controlling component 621 include a BPR, a fixed restrictor, a thermally modulated variable restrictor, or other system pressure regulator. The restrictor 619 routes a portion of the total mobile phase flow rate to the detector 623 for detection. The split-flow chromatography system 600 differs from the system described in reference to FIG. 5 in that the detector 623 is split from the pressure-controlling component 621. In this example, the mobile phase retains appreciable solvating power until the analyte is within the detector 623. The split-flow interface provides additional capabilities for controlling the interface between the chromatography system with a pressure-controlling component 621 to a low-pressure detector 623. With the use of a fixed restrictor, a change to the system pressure or mobile phase viscosity can result in a change in the split ratio, which can interfere with quantitation.

One or more sensors can be disposed at various points in the mobile phase streams, e.g., downstream of the chromatography column 615. For example, a sensor disposed between the chromatography column 615 and the tee fitting 618 can be a pressure transducer that measures the system pressure before the stream of mobile phase is split. Alternatively, a sensor such as a viscometer can be configured to measure the composition of the mobile phase. Such measurements can be used to detect changes in the chromatographic run, for example, those pressure changes corresponding to a density program or mobile phase composition changes corresponding to a composition gradient. As another example, a first sensor may be disposed in the main mobile phase flow between the tee fitting 618 and the pressure-controlling component 621 to measure the total mass flow rate, and a second sensor may be disposed in the minority mobile phase stream between the restrictor 619 and the detector 623 to measure the mass flow rate of the minority portion. The split ratio can be determined from the ratio of these flow rates. As another example, a sensor or sensors may be disposed in the main mobile flow between tee fitting 618 and the outlet of the system which is downstream of the pressure-controlling element 621 to directly or indirectly measure the mass flow rate. The flow rate of the minority portion can be calculated as the difference between the pump flow rate and the measured pressure-controlling element flow rate. The mobile phase composition and flow rate as well as the BPR set point should be established at a known value prior to measurement.

For a split-flow interface, a degrading or failing restrictor reduces the mobile phase flow rate directed down the split leg towards that restrictor. The flow rate increases proportionally in the other leg, towards the pressure-controlling component. Therefore, the condition of the restrictor 619 can be diagnosed based on flow rate measurements. That is, the condition of restrictor 619 can be diagnosed based on measurement data derived from monitoring the flow rate through the pressure-controlling component at a predetermined pressure, such as but not limited to a BPR at a predetermined BPR pressure. The specified threshold flow rate can be determined based on a restrictor that is calibrated or characterized. In a non-limiting example where the pressure-controlling component is a BPR, if a restrictor passes about 500 µL/min in its pristine state at 2000 PSI, and the mobile phase flow rate is about 1.5 mL/min, the flow rate towards the BPR should be about 1.0 mL/min. Measurement data showing an increase in the BPR flow rate can be used in the computation of an indicator that the restrictor is degrading or failing. The specified threshold flow rate can be set as the threshold value of flow rate to the BPR at which the signal should be generate to indicate that the restrictor should be changed. A mass flow meter can be used for monitoring the flow rate, or the position of the BPR itself may be used as a measure of the flow rate.

In this example split-flow chromatography system, the change in performance of the restrictor can result in changes in flow rate in the split legs. Thus, the change in condition of the restrictor (such as restrictor degradation or failure) can be monitored based on a change in pressure or flow rate in the chromatography system 600. Accordingly, measurement data indicating changes in the measured flow rate, as compared to a specified threshold flow rate, can be used for diagnosing the condition of the restrictor element of chromatography system 600 as described in connection with any of FIG. 1A, 2, or 3A. In addition, measurement data indicating changes in the measured pressure, as compared to a specified threshold pressure, can be used for diagnosing the condition of the restrictor element of chromatography system 600 as described in connection with any of FIG. 1B, 2, or 3B.

The examples of FIGS. 1B and 3B can apply to a chromatography system that includes two (or more) restrictors, each disposed in parallel to control a split. If either restrictor begins to degrade or fail, the pressure in the chromatography system changes. That is, the change in condition of the restrictor (such as restrictor degradation or failure) can be monitored based on a change in pressure. Measurement data indicating changes in the measured pressure, as compared to a specified threshold pressure, can be used for diagnosing the condition of the restrictor element of a chromatography system including two or more restrictors, as described in connection with any of FIG. 1B, 2, or 3B.

The example systems, methodologies, apparatus and kits described herein can be used in a chromatography system that includes two pressure-controlling components. In such as example, employing an additional (secondary) pressure regulation device or pressure control element in a $CO_2$-based chromatography system allows for efficient full-flow introduction of the mobile phase stream to a low-pressure detector when using a back pressure regulator. The secondary pressure control device ensures mobile phase density all the way into the detector, thereby preventing phase separation and analyte precipitation, which may occur without a secondary pressure control device.

Figure 7:
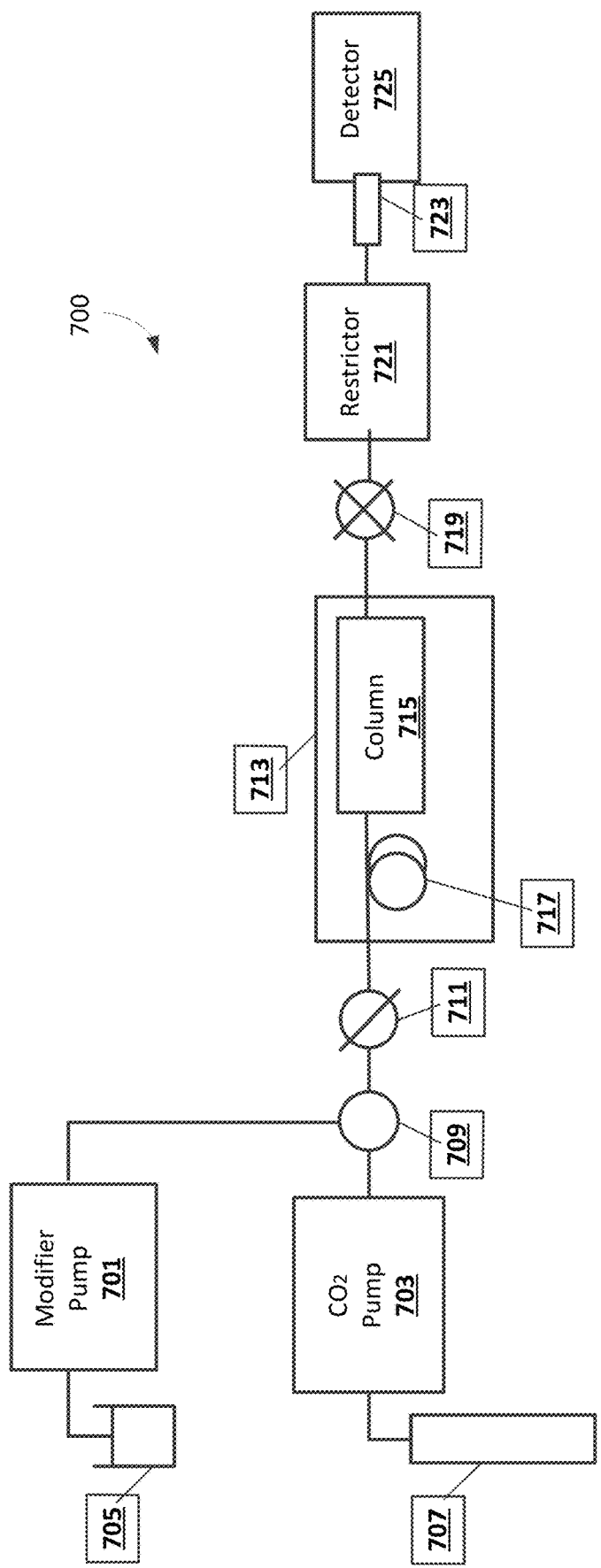

FIG. 7 is a block diagram illustrating an example $CO_2$-based chromatography system 600 including a restrictor component, which includes a secondary pressure control device. Modifier pump 701 is used to pump a liquid modifier from a solvent reservoir 705 to a chromatography column 715 through a mixer 709 and injector 711. A $CO_2$ pump 703 is used to pump $CO_2$ from a $CO_2$ container 707 to the chromatography column 715 through the mixer 709 and injector 711. The column 715 is located within a column oven 713. The column oven 713 includes preheating elements 717 used for heating and controlling the temperature of the mobile phase entering the column 715. A primary pressure control element 719 is located downstream of the column 715 and upstream of a restrictor 721. A secondary pressure control element 723 is located downstream of the restrictor 721 and upstream of a detector 725. In a non-limiting example, the primary pressure control element 721 can be an active BPR. The primary pressure control element 719 can be used to control pressure of the mobile phase within the column 715.

In some examples, the secondary pressure control device 723 is located as close as possible to the point of detection inside the detector 725. For example, in one embodiment, the point of detection of a FID is the flame and in another embodiment, the point of detection in a ESI-MS is the ESI spray plume. In one embodiment, the outlet of the secondary pressure control element 723 can be located within about 5.0 cm from the inlet of the detector 725. The secondary pressure control element 723 can be, for example, a restrictor, a back pressure regulator, or a variable restrictor (such as but not limited to a thermally modulated variable restrictor). This example shows a secondary pressure control device 723 incorporated into a full-flow $CO_2$-based chromatography system. The secondary pressure control device 723 provides for increased $CO_2$/co-solvent miscibility and improved analyte transport from the primary pressure control element 719 to the detector 725. The secondary pressure control device 723 addresses the limitations encountered with interfacing $CO_2$-based chromatography to detection and helps prevent phase separation while transporting the analyte from the primary pressure control device 719 to the detector 723.

In a non-limiting example, the primary pressure control element 719 is a BPR and the secondary pressure control device 723 is a fixed restrictor. In another embodiment, both the primary pressure control element 719 and the secondary pressure control device 723 can be BPRs.

In example chromatography system 700 that includes both a primary pressure control element 719 and a secondary pressure control device 723, the change in condition of the restrictor (such as restrictor degradation or failure) can be monitored based on a change in pressure. Measurement data indicating changes in the measured pressure, as compared to a specified threshold pressure, can be used for diagnosing the condition of the restrictor element of chromatography system 600 as described in connection with any of FIG. 1B, 2, or 3B.

In a non-limiting example, the primary pressure control element 719 is a BPR and the secondary pressure control device/element 723 is a fixed restrictor. In this example, the restrictor should have a known pressure at a set flow rate and mobile phase composition. Turning off the first BPR, setting the flow and composition to specified values, and measuring the resultant system pressure can give a relative measure of the state of the restrictor. If the pressure is higher than expected, the signal can be generated to cause the replacement of the restrictor.

Figure 8A:
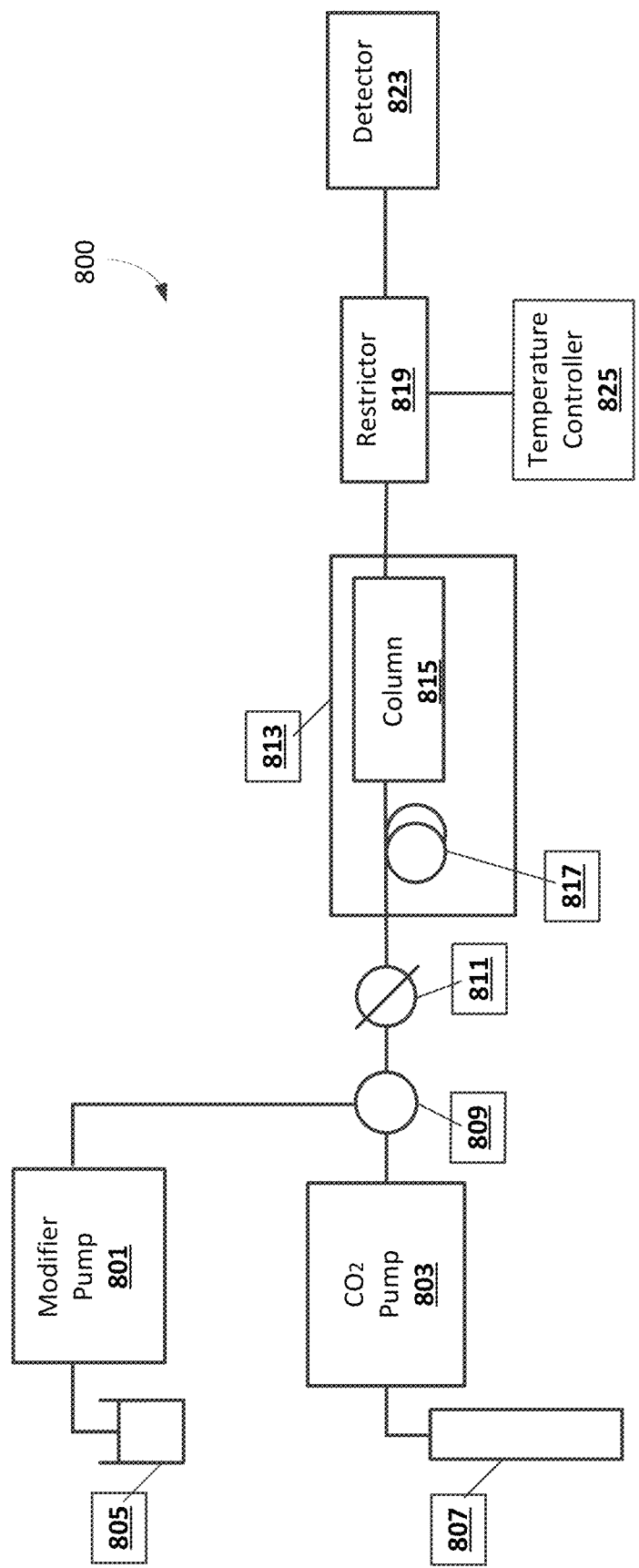

FIG. 8A is a block diagram illustrating an example $CO_2$-based chromatography system 800 that includes a thermally modulated variable restrictor component. This example chromatography system 800 illustrates an example architecture of a solvent delivery system for mixing a modifier with the $CO_2$, such as but not limited to a modifier (e.g., methanol) or a ternary additive (e.g., pH controllers)). As shown in FIG. 8, a modifier pump 801 is used to pump a liquid modifier from a solvent reservoir 805 to a chromatography column 815 through a mixer 809 and an injector 811. In parallel to the modifier pump 801, a $CO_2$ pump 803 is used to pump $CO_2$ from a $CO_2$ container 807 to the chromatography column 815 through the mixer 809 and injector 811. In this example, the column 815 is located within a column oven 813, which includes preheating elements 817. A thermally modulated variable restrictor 819 is located downstream of the chromatography column 815 and upstream of a detector 823.

Figure 8B:
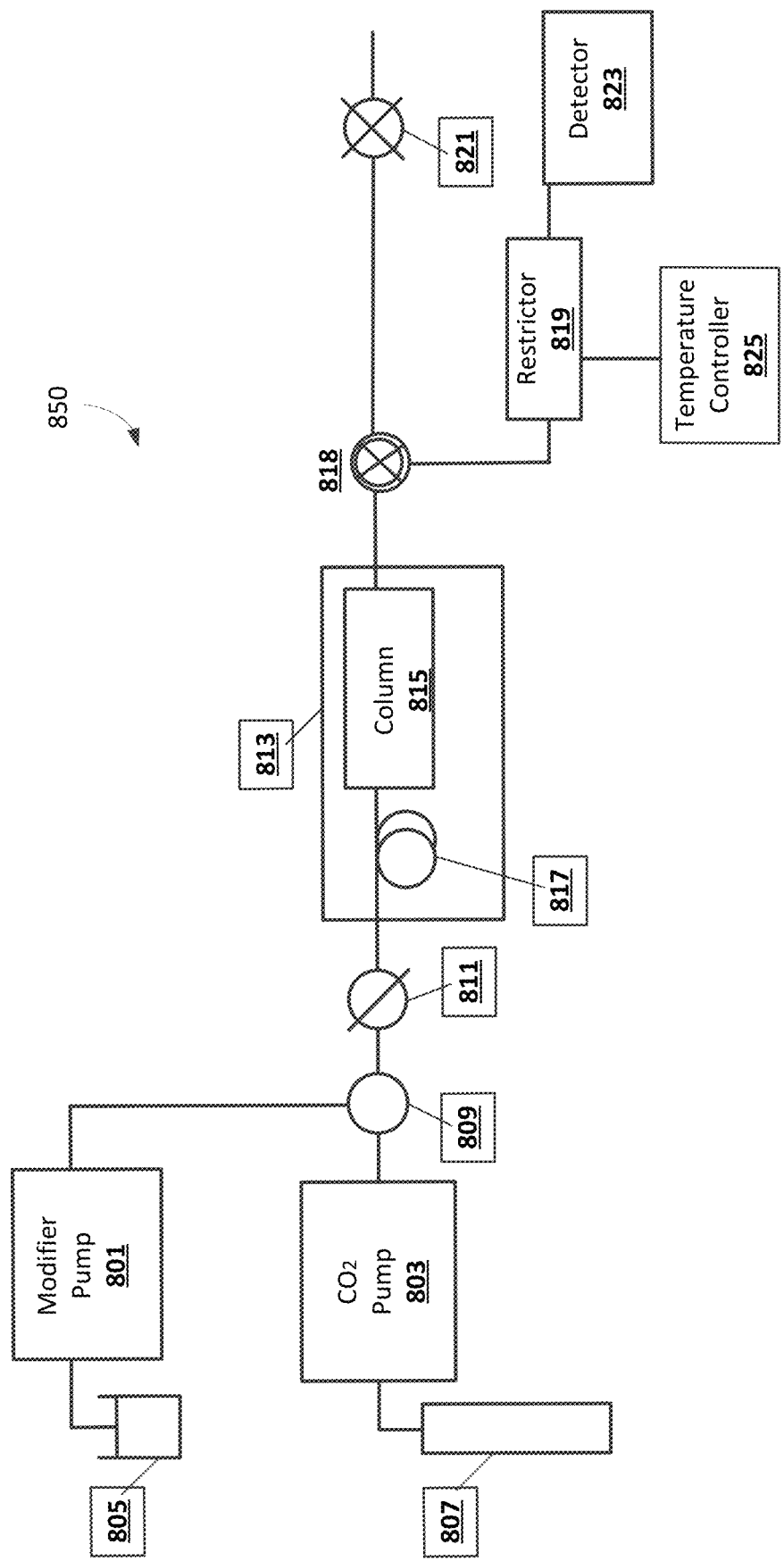

FIG. 8B is a block diagram illustrating an example split-flow $CO_2$-based chromatography system 850 that includes a thermally modulated variable restrictor component. That is, this embodiment includes a thermally modulated variable restrictor 819 located downstream of column 815 (similar to the embodiment shown in FIG. 8A and described above) and also a split flow interface (similar to that shown in FIG. 6). This example chromatography system 850 illustrates an example architecture of a solvent delivery system for mixing a modifier with the $CO_2$, such as but not limited to a modifier (e.g., methanol) or a ternary additive (e.g., pH controllers)). As shown in FIG. 8B, a modifier pump 801 is used to pump a liquid modifier from a solvent reservoir 805 to a chromatography column 815 through a mixer 809 and an injector 811. In parallel to the modifier pump 801, a $CO_2$ pump 803 is used to pump $CO_2$ from a $CO_2$ container 807 to the chromatography column 815 through the mixer 809 and injector 811. In this example, the column 815 is located within a column oven 813, which includes preheating elements 817. A thermally modulated variable restrictor 819 is located downstream of the chromatography column 815 and upstream of a detector 823. The example chromatography system 850 achieves the splitting using a tee fitting 818 and a restrictor 819 in the mobile phase stream. The tee fitting 818 routes a majority portion of the mobile phase flow to a pressure-controlling component 821 for maintaining and controlling system pressure. Non-limiting examples of the pressure-controlling component 821 include a BPR, a fixed restrictor, a thermally modulated variable restrictor, or other system pressure regulator. The restrictor 819 routes a portion of the total mobile phase flow rate to the detector 823 for detection. The split-flow interface provides additional capabilities for controlling the interface between the chromatography system with a pressure-controlling component 821 to a low-pressure detector 823.

In both FIGS. 8A and 8B, a temperature controller 825 is coupled to the thermally modulated variable restrictor 819. The temperature controller 825 can be used to determine the temperature of the mobile phase within the thermally modulated variable restrictor 819 and, if necessary, to adjust the temperature applied to a heated region of the thermally modulated variable restrictor 819 in order to attain a target pressure. A predetermined mapping of temperature to pressure can be used to determine the temperature adjustment.

While operating a chromatography system with a thermally modulated thermal restrictor (e.g., 819 in FIGS. 8A and 8B), a certain pressure can be expected at a set temperature, mobile phase flow rate, and mobile phase composition. If the pressure is higher than expected, or the temperature of the restrictor is lower than expected, the restrictor may be degrading or failing and should be replaced. Thus, the change in condition of the restrictor (such as restrictor degradation or failure) can be monitored based on a change in pressure in the chromatography system 800. Accordingly, the example systems, methodologies, apparatus or kits described in connection with any of FIG. 1B, 2, or 3B can be used to diagnose the condition of the restrictor element. For example, measurement data indicating changes in the measured pressure, as compared to a specified threshold pressure, can be used for diagnosing the condition of the restrictor element of chromatography system 800 as described in connection with any of FIG. 1B, 2, or 3B. In some embodiments, the restrictor itself sends identifying data to a processing unit used in the diagnosis.

That is, each restrictor in the system can include identifying data (e.g., restrictor 1, restrictor 2, etc.), and the measurement data indicating that there is a change in measured pressure, includes the identifying data, such that the failing restrictor can be quickly identified.

Figure 9:
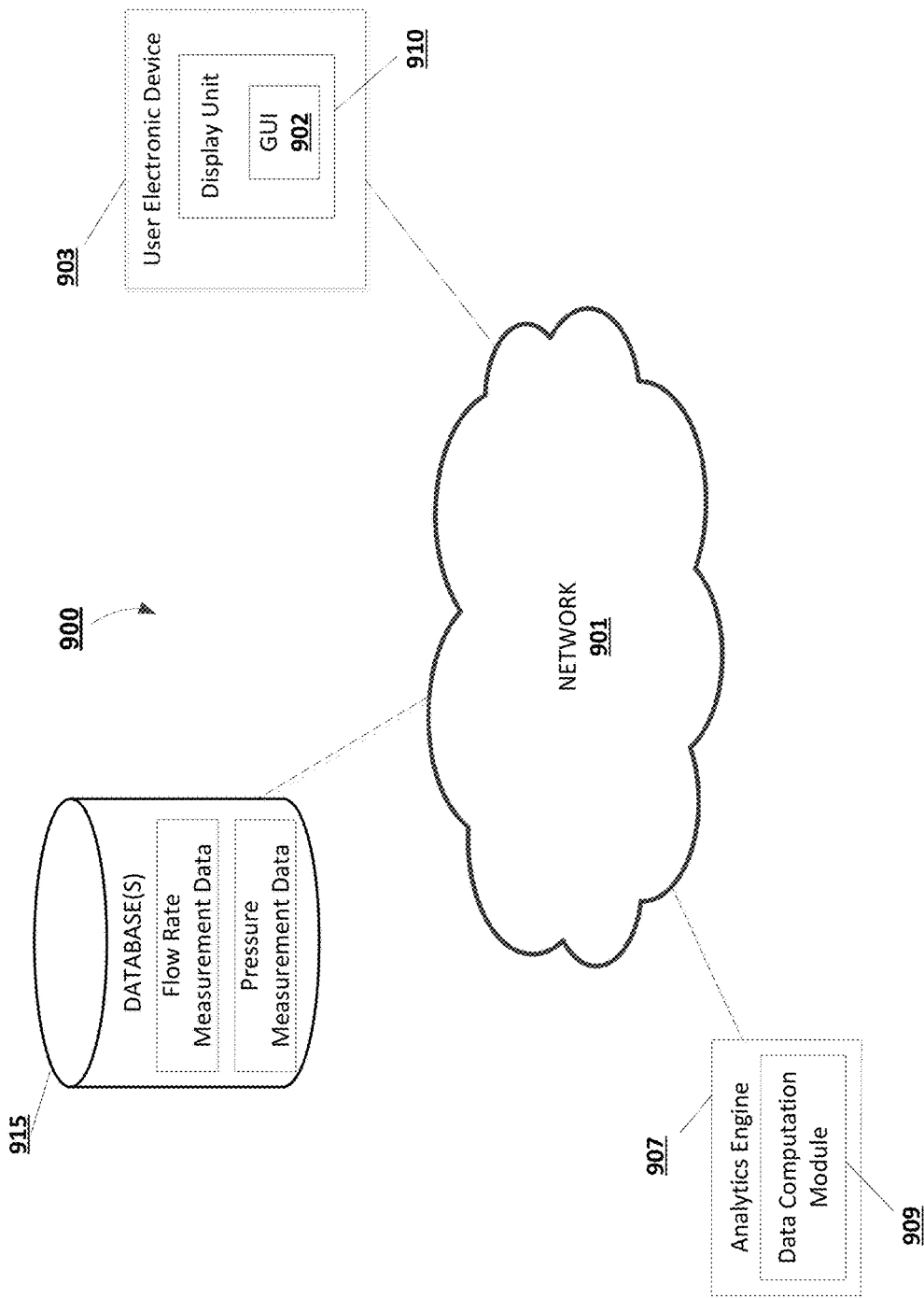
FIG. 9 is a diagram of an example network environment suitable for a distributed implementation, according to principles of the present disclosure.

FIG. 9 illustrates a network diagram depicting a system 900 suitable for a distributed implementation of example systems described herein. The system 900 can include a network 901, a user electronic device 903, an analytics engine 907, and a database 915. As will be appreciated, the analytics engine 907 can be local or remote servers, and various distributed or centralized configurations may be implemented, and in some embodiments a single server can be used. In exemplary embodiments, the analytics engine 907 can include one or more modules 909, which can implement one or more of the processes described herein, or portions thereof, with reference to any one or more of FIGS. 1A-8B. For example, the analytics engine 907 can include a data computation module 909 configured to perform one or more of the processes and computations described in connection with any one or more of FIGS. 1A-8B. The user electronic device 903 and analytics engine 907 can communicate with each other and with the database 915 and at least one component of the chromatography system (as described above relative to FIGS. 1A-8B) to transmit and receive measurement data (such as but not limited to flow rate data, and/or pressure data, and/or temperature data), perform database queries, and implement the processes described above.

In exemplary embodiments, the user electronic device 903 may include a display unit 910, which can display a GUI 902 to a user of the device 903 such that the user can view the rendered graphic icon, visual display, or type of other signal used to indicate that a failing restrictor is to be replaced, as described above. The user electronic device 903 may include, but is not limited to, smart phones, tablets, ultrabooks, netbooks, laptops, computers, general purpose computers, Internet appliances, hand-held devices, wireless devices, portable devices, wearable computers, cellular or mobile phones, portable digital assistants (PDAs), desktops, multi-processor systems, microprocessor-based or programmable consumer electronics, game consoles, set-top boxes, network PCs, mini-computers, and the like. The user electronic device 903 may include some or all components described in relation to computing device 1000 shown in FIG. 10. The user electronic device 903 may connect to network 901 via a wired or wireless connection. The user electronic device 903 may include one or more applications such as, but not limited to, a web browser, a sales transaction application, an object reader application, and the like.

In exemplary embodiments, the user can interact with the user electronic device 903 using a keyboard, mouse, gamepad controller, voice commands, or non-touch gestures recognizable by the user electronic device. In alternative embodiments, the user electronic device 903 can be a mobile device, such as a smartphone, or tablet.

In exemplary embodiments, the user electronic device 903, analytics engine 907, and database 915 may be in communication with each other via a communication network 901. The communication network 901 may include, but is not limited to, the Internet, an intranet, a LAN (Local Area Network), a WAN (Wide Area Network), a MAN (Metropolitan Area Network), a wireless network, an optical network, and the like. In one embodiment, the user electronic device 903, and analytics engine 907 can transmit instructions to each other over the communication network 901. In exemplary embodiments, the flow rate measurement data, pressure measurement data, and other data (including temperature data) can be stored at database 915 and received at the analytics engine 907.

Figure 10:
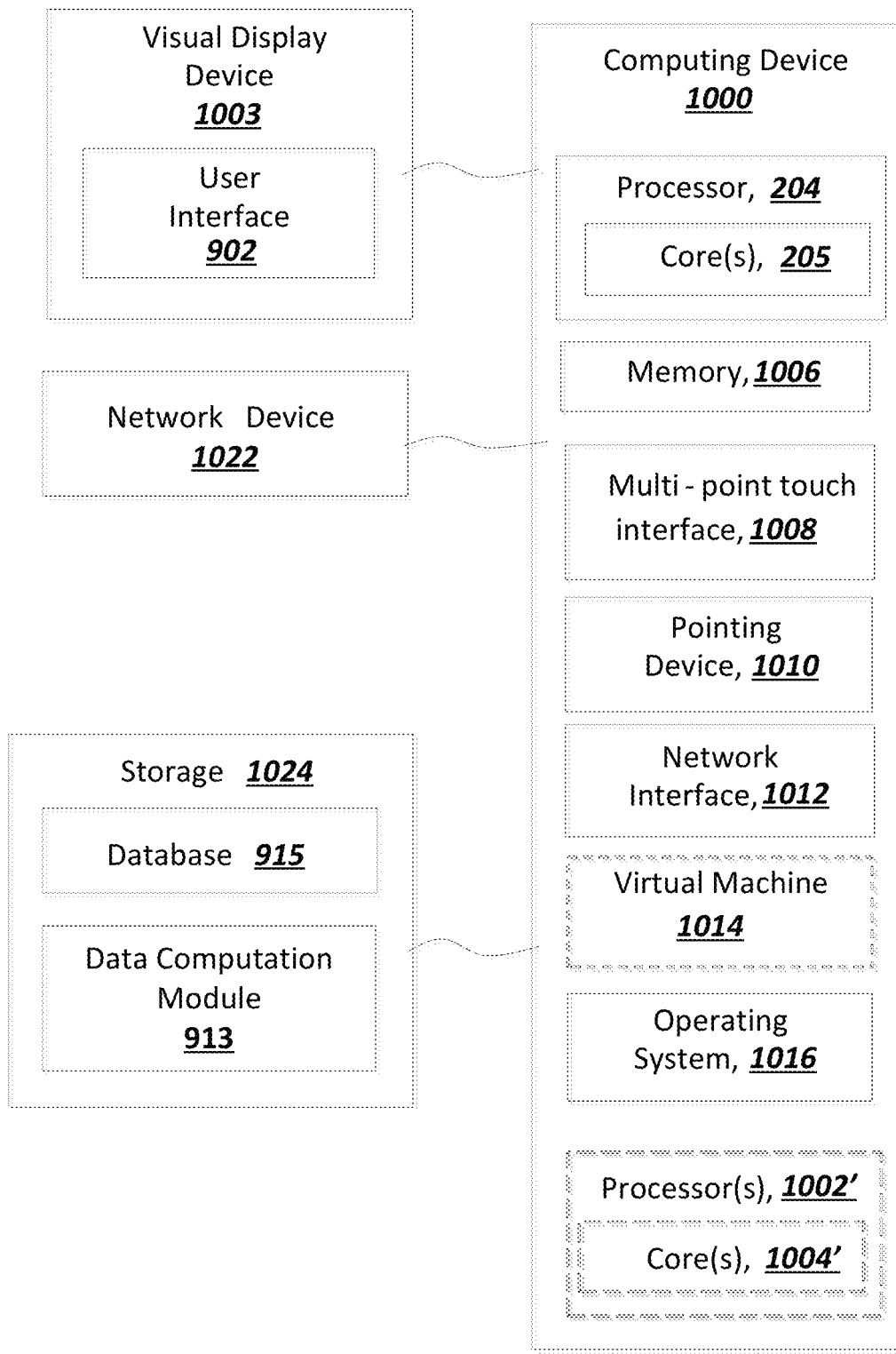
FIG. 10 is a block diagram of an example computing device that can be used to perform example processes and computations, according to principles of the present disclosure.

FIG. 10 is a block diagram of an exemplary computing device 1000 that can be used in the performance of any of the example methodologies according to the principles described herein (including example methodologies associated with any one or more of FIGS. 1A-8B). The computing device 1000 includes one or more non-transitory computer-readable media for storing one or more computer-executable instructions (such as but not limited to software or firmware) for implementing any example method according to the principles described herein (including example methodologies associated with any one or more of FIGS. 1A-8B). The non-transitory computer-readable media can include, but are not limited to, one or more types of hardware memory, non-transitory tangible media (for example, one or more magnetic storage disks, one or more optical disks, one or more USB flashdrives), and the like.

For example, memory 1006 included in the computing device 1000 can store computer-readable and computer-executable instructions or software for implementing exemplary embodiments and programmed to perform processes described above in reference to any one or more of FIGS. 1A-8B (including processor-executable instructions 208). The computing device 1000 also includes processing unit 204 (and associated core 205), and optionally, one or more additional processor(s) 1002' and associated core(s) 1004' (for example, in the case of computer systems having multiple processors/cores), for executing computer-readable and computer-executable instructions or software stored in the memory 1006 and other programs for controlling system hardware. Processing unit 204 and processor(s) 1002' can each be a single core processor or multiple core (205 and 1004') processor.

Virtualization can be employed in the computing device 1000 so that infrastructure and resources in the computing device can be shared dynamically. A virtual machine 1014 can be provided to handle a process running on multiple processors so that the process appears to be using only one computing resource rather than multiple computing resources. Multiple virtual machines can also be used with one processor.

Memory 1006 can be non-transitory computer-readable media including a computer system memory or random access memory, such as DRAM, SRAM, EDO RAM, and the like. Memory 1006 can include other types of memory as well, or combinations thereof.

A user can interact with the computing device 1000 through a visual display device 1003, such as a touch screen display or computer monitor, which can display one or more user interfaces 902 that can be provided in accordance with exemplary embodiments. The computing device 1000 can also include other I/O devices for receiving input from a user, for example, a keyboard or any suitable multi-point touch interface 1008, a pointing device 1010 (e.g., a pen, stylus, mouse, or trackpad). The keyboard 1008 and the pointing device 1010 can be coupled to the visual display device 1003. The computing device 1000 can include other suitable conventional I/O peripherals.

The computing device 1000 can also include one or more storage devices 1024, such as a hard-drive, CD-ROM, or other non-transitory computer readable media, for storing data and computer-readable instructions and/or software, such as a data computation module 913 that can implement exemplary embodiments of the methodologies and systems as taught herein, or portions thereof. Exemplary storage device 1024 can also store one or more databases 915 for storing any suitable information required to implement exemplary embodiments. The databases can be updated by a user or automatically at any suitable time to add, delete, or update one or more items in the databases. Exemplary storage device 1024 can store one or more databases 915 for storing flow rate measurement data, pressure measurement data, and any other data/information used to implement exemplary embodiments of the systems and methodologies described herein.

The computing device 1000 can include a network interface 1012 configured to interface via one or more network devices 1022 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1012 can include a built-in network adapter, network interface card, PCMCIA network card, card bus network adapter, wireless network adapter, USB network adapter, modem or any other device suitable for interfacing the computing device 1000 to any type of network capable of communication and performing the operations described herein. Moreover, the computing device 1000 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1000 can run any operating system 1016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1016 can be run in native mode or emulated mode. In an exemplary embodiment, the operating system 1016 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

In alternative embodiments, the techniques described above with respect to pumps used in CO2-based chromatography systems may be applicable to pumps used in other types of chromatography systems that include mobile phases that vary greatly in density with minor changes in temperature. For example, a mobile phase including methanol at extremely high pressures may in some instances benefit from added temperature control. In describing certain example, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the disclosure.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methodologies, if such features, systems, articles, materials, kits, and/or methodologies are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. Method for identifying a failure of a restrictor of a chromatography system, the method comprising:
   measuring a first flow rate of a $CO_2$-based mobile phase through a component of the chromatography system;
   using at least one processing unit, comparing the measured first flow rate to a specified threshold flow rate to determine a condition of the restrictor, the threshold flow rate being computed based on a restrictor flow rate that is associated with a failure of the restrictor; and
   generating a signal, using the at least one processing unit, based on the condition of the restrictor, the signal comprising instructions to replace the restrictor in response to the condition of the restrictor being indicated as a failure.

2. The method of claim 1, wherein the component is a pressure-controlling fluid interface and the first flow rate is the flow rate of the pressure-controlling fluid.

3. The method of claim 1, wherein the $CO_2$-based mobile phase further comprises, in addition to the $CO_2$, a modifier, a ternary additive, or a combination of one or more modifiers and one or more ternary additives.

4. The method of claim 1, wherein the first flow rate is a backpressure regulator (BPR) flow rate of the $CO_2$-based mobile phase through a backpressure regulator during operation at a specified pressure.

5. The method of claim 4, wherein the chromatograph system comprises a split-flow interface, wherein the component is the backpressure regulator (BPR), and wherein the restrictor is coupled to the split-flow interface.

6. The method of claim 5, wherein the first flow rate is the BPR flow rate of the $CO_2$-based mobile phase through the backpressure regulator during operation at a specified composition.

7. Method for identifying a failure of a restrictor of a chromatography system, the method comprising:
   setting a mobile phase flow rate and composition of a $CO_2$-based mobile phase through the chromatography system to a specified value;
   measuring a pressure of the chromatography system;
   using at least one processing unit, comparing the measured pressure to a specified threshold pressure to determine a condition of the restrictor, the threshold pressure being associated with a failure of the restrictor; and
   generating a signal, using the at least one processing unit, based on the condition of the restrictor, the signal comprising instructions to replace the restrictor in response to the condition of the restrictor being indicated as a failure.

8. The method of claim 7, wherein the restrictor is a thermally-modulated variable restrictor, and the method further comprises measuring the pressure of the chromatography system at a specified temperature of the thermally-modulated variable restrictor.

9. The method of claim 7, wherein the $CO_2$-based mobile phase further comprises, in addition to the $CO_2$, a modifier, a ternary additive, or a combination of one or more modifiers and one or more ternary additives.

10. The method of claim 7, wherein the signal to indicate instructions to replace the restrictor is at least one of an audible alarm, a visual display, or a graphic icon.

11. The method of claim 7, wherein the restrictor is a fixed restrictor, and wherein the chromatograph system comprises:
a first pressure-controlling component; and
a second component positioned downstream of the first backpressure regulator, the second component being at least one of a second pressure-controlling component or a flow-controlling component.

12. The method of claim 11, further comprising:
operating the chromatography system without using the first pressure-controlling component while operating the second component prior to measuring the pressure of the chromatography system.

13. The method of claim 7, wherein the chromatography system comprises a pressure-controlling fluid interface.

14. The method of claim 13, wherein the measuring the pressure of the chromatography system comprises measuring the pressure of the $CO_2$-based mobile phase through the restrictor at a set flow rate of pressure-controlling fluid.

15. A kit for a chromatography system with independent control of system pressure and flow rate of a $CO_2$-based mobile phase, the kit comprising:
at least one restrictor; and
at least one processing unit in communication with the at least one restrictor, the at least one processing unit comprising processor-executable instructions to:
receive data indicative of a measurement of a first flow rate of a $CO_2$-based mobile phase through a pressure-controlling component or a flow-controlling component of the chromatography system;
compare the measured first flow rate to a specified threshold flow rate to determine a condition of the restrictor, the threshold flow rate being computed based on a restrictor flow rate that is associated with a failure of the restrictor; and
generate a signal based on the condition of the restrictor, the signal comprising instructions to replace the restrictor in response to the condition of the restrictor being indicated as a failure.

16. The kit of claim 15, wherein the signal to indicate instructions to replace the restrictor is at least one of an audible alarm, a visual display, or a graphic icon.

17. The kit of claim 15, wherein the $CO_2$-based mobile phase further comprises, in addition to the $CO_2$, a modifier, a ternary additive, or a combination of one or more modifiers and one or more ternary additives.

18. The kit of claim 15, wherein the at least one processing unit further comprises processor-executable instructions to receive data identifying the pressure-controlling component and the flow-controlling component of the chromatography system.

19. The kit of claim 18, wherein, in response to receiving data identifying the pressure-controlling component as a backpres sure regulator, and identifying the flow-controlling component as a split-flow interface coupled to the restrictor, the at least one processing unit further comprises processor-executable instructions to cause the chromatography system to:
operate the chromatography system at a specified pressure and a specified composition; and
measure the first flow rate through the backpres sure regulator.

20. The kit of claim 18, wherein, in response to receiving data identifying the pressure-controlling component as a pressure-controlling interface, the at least one processing unit further comprises processor-executable instructions to cause the chromatography system to:
set a second flow rate of the $CO_2$-based mobile phase of known composition through the chromatography system to a specified value;
measure the first flow rate through the pressure-controlling interface.

* * * * *